June 17, 1941.  A. E. CHERNACK  2,245,758
FLEXIBLE TUBE
Filed May 4, 1938    3 Sheets-Sheet 1
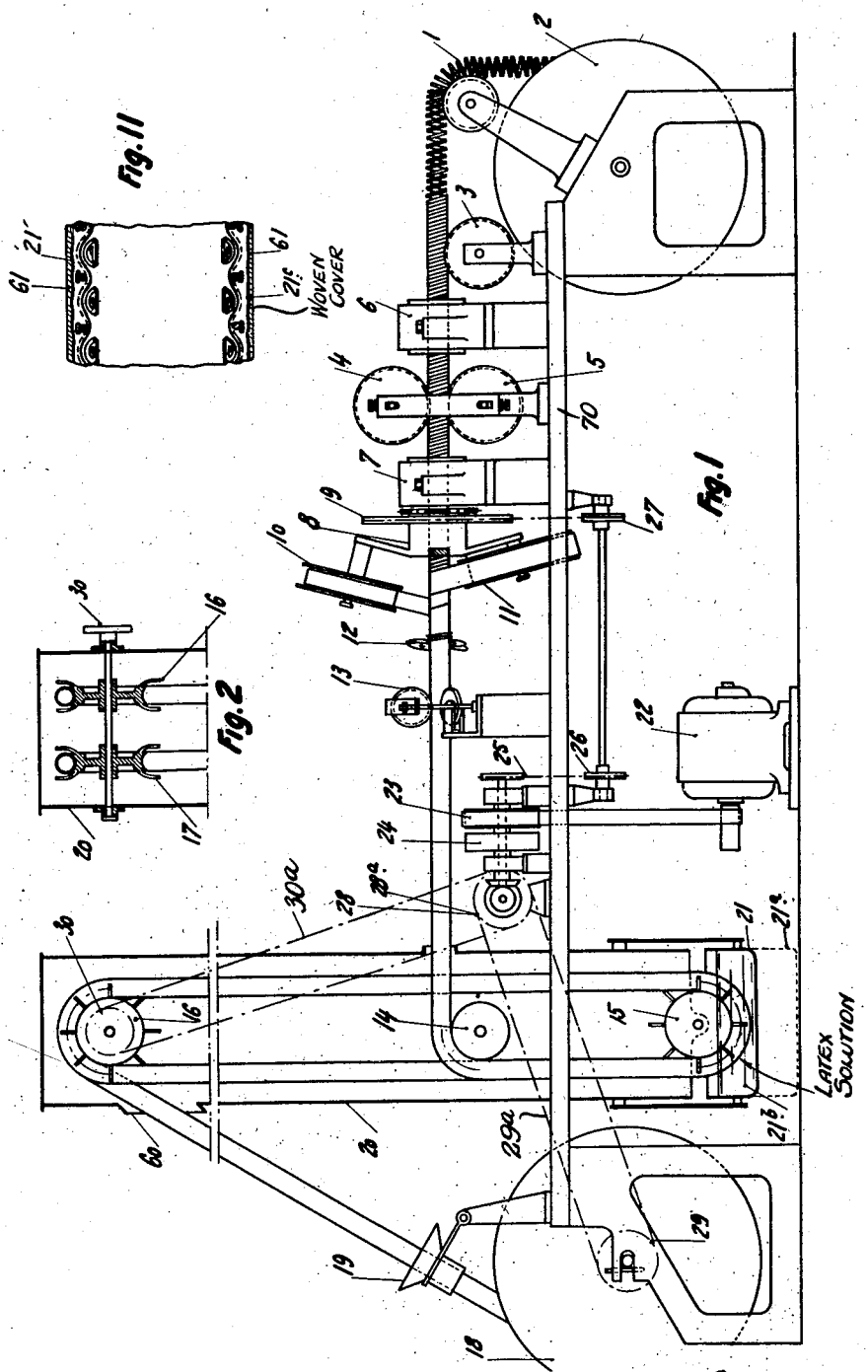
A. E. Chernack
Inventor

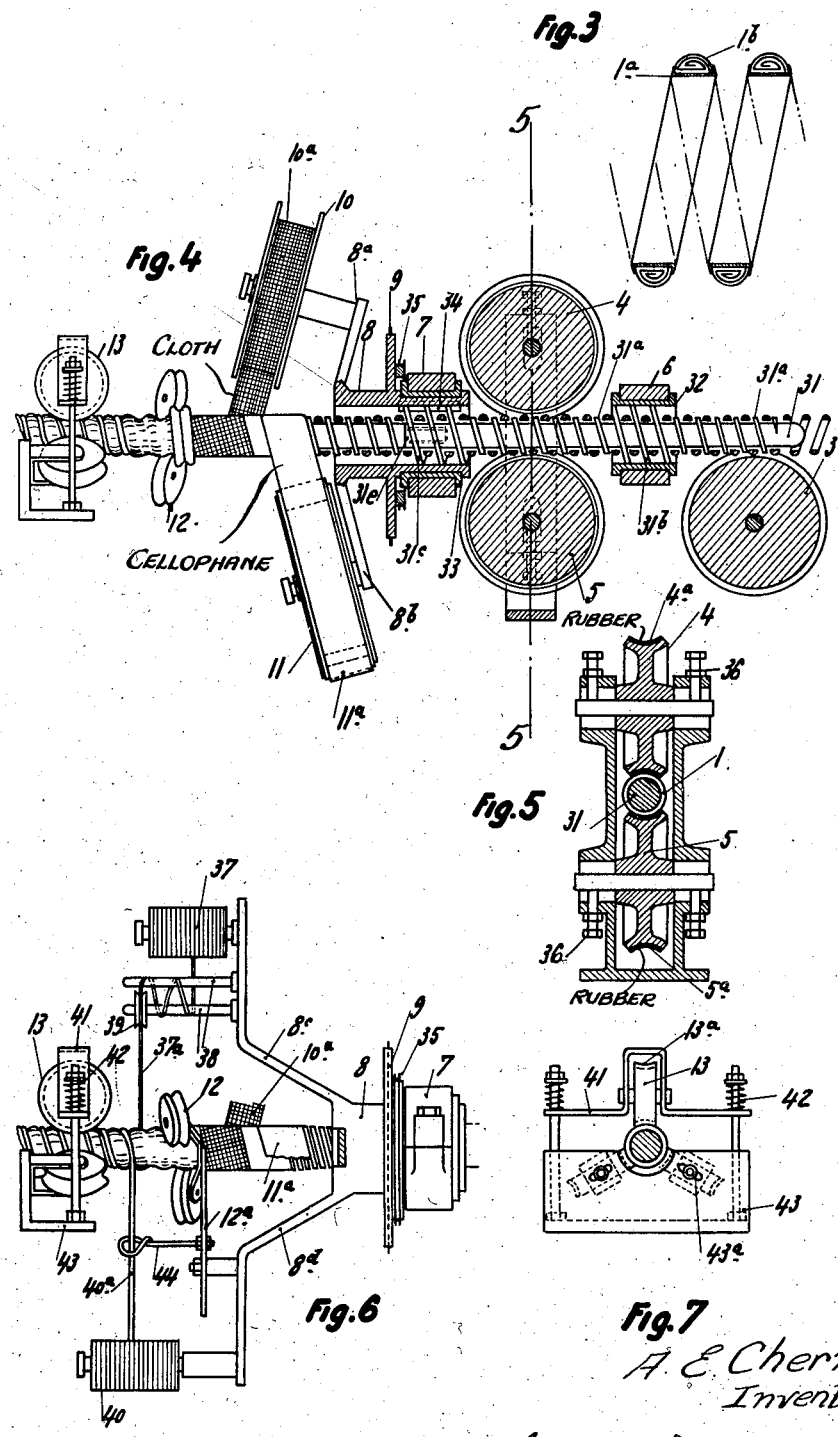

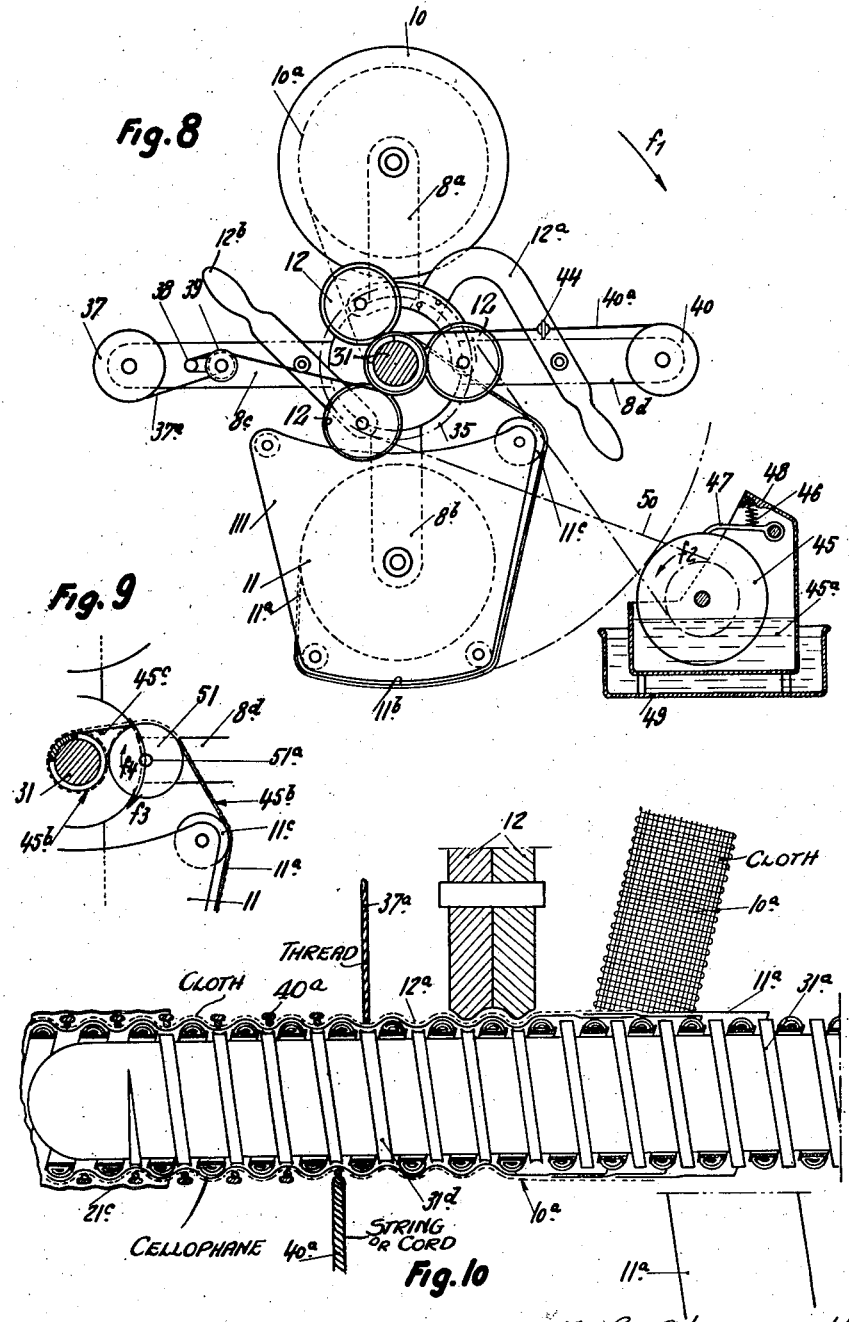

Patented June 17, 1941

2,245,758

UNITED STATES PATENT OFFICE 2,245,758

FLEXIBLE TUBE

Abel Edgar Chernack, Paris, France

Application May 4, 1938, Serial No. 206,095
In France May 13, 1937

14 Claims. (Cl. 154—6)

The present invention relates to the manufacture of flexible tubes lined with materials capable of resisting the chemical action of hydrocarbons and similar liquids.

An object of the invention resides in providing apparatus for manufacturing flexible tubes wherein a helical metal spring is covered with several layers of protecting material including means for coating and sealing the covering of the metal spring.

According to another feature of the present invention, relating to the machine for the manufacture of the flexible tube, the metallic spring is guided and supported, in the course of its translatory movement, by a rigid screw and, in order to permit of supporting and rotating this screw, a portion of the threads thereof is of substantially greater diameter than the remainder. This portion of the screw is mounted in suitable bearings, the helices of spring passing inside the screw threads so that there is no interference with the axial translatory movement of the spring.

According to still another feature of the present invention the continuous tube is constituted by the superposition, on the metallic spring, of a band of protective material, helically wound and glued thereon in the form of a continuous wall, a cotton cloth band wound in a similar manner and held by helically wound strings, and a continuous rubber or equivalent layer.

In the following description and claims, the expression cotton cloth band includes any loosely woven fabric between the meshes of which latex or an equivalent liquid can penetrate. The protecting material may consist of cellulose in the form of sheets such as "Cellophane," paper, or thin bands of synthetic products such as "Neoprene" or vinyl resins alone or in combination with a fabric.

Other features of the present invention will result from the following detailed description of a specific embodiment thereof.

A preferred embodiment of the present invention will be hereinafter described, with reference to the accompanying drawings, given merely by way of example, and in which:

Fig. 1 is a general view in elevation of an embodiment of the machine according to the present invention;

Fig. 2 is a partial sectional view of the top part of the drying chamber for the tube coated with liquid rubber or the like;

Fig. 3 is a detail view showing an axial section of the spring;

Fig. 4 is a longitudinal sectional view on an enlarged scale of the screw and the mechanisms cooperating therewith;

Fig. 5 is a transverse sectional view on the line 5—5 of Fig. 4;

Fig. 6 is a plan view of a part of the system of Fig. 4;

Fig. 7 is a transverse sectional view of the arrangement of a combination of guiding rollers;

Fig. 8 is a transverse sectional view of the machine of Fig. 1 showing the gluing device;

Fig. 9 is a diagrammatical view illustrating the means for coating both sides of the band of Cellophane with glue;

Fig. 10 is an axial sectional view on an enlarged scale diagrammatically showing the formation of the various layers of materials around the metallic spring;

Figure 11 is a fragmentary sectional view of the complete tube.

The spring I is shown in detail by the sectional view of Fig. 3. It is constituted by a helically wound channel-shaped band $1a$ in which is tightly housed or wedged a paper cord $1b$, so that the whole is of semi-circular section, with the flat side on the inside of the spring. Of course, this particular structure is shown merely by way of example.

This spring, of the same pitch as screw 31, cooperates with said screw (see Fig. 4). The diameter of the threads of this screw varies along its length. Starting from the right hand side, there is first a part, marked $31a$, where the outer diameter of the threads is smaller than the outer diameter of spring 1. Then there is a portion, marked $31b$, where the outer diameter of the threads is substantially greater than the outer diameter of the spring. Then there is again a portion of the same diameter $31a$ as the first portion on the right hand end, and a portion of larger diameter $31c$. The remainder of the screw, from this point on, is constituted by a separate piece, screwed in the first as shown at $31e$. As visible in Fig. 10, the threads of this separate screw element are first of diameter $31a$, then near the left end, of a smaller diameter $31d$.

The portions $31b$ and $31c$ of the screw of a diameter substantially greater than the outer diameter of the spring constitute the journals of said screw, being supported in bearings 6 and 7, respectively, through the intermediate bushings 32 and 33. In this way, although the screw is firmly supported in its two bearings, 6 and 7, they do not interfere with the movement of the spring.

Grooved pulleys 3, 4 and 5 prevent spring 1 from turning together with screw 31.

Rollers 4 and 5 are grooved and disposed between bearings 6 and 7. The spindles of these rollers, at right angles to the axis of said screw, are carried in an adjustable manner (owing to the provision of screws 36 or the equivalent) in an upright support mounted on the frame 70 of the machine. The grooves of said rollers, lined with rubber as shown at 4a and 5a (Fig. 5), cooperate with spring 1 which, along this portion of screw 31, is of an outer diameter greater than the outer diameter of the screw threads. These pulleys 4 and 5 are free to rotate about their spindles so that, while preventing lateral displacement or rotation of the spring, they permit the axial translatory movement thereof.

On the right hand side of bearing 6, a similar roller 3 performs the same function to wit to prevent the spring from rotating.

While screw portion 31b is directly mounted in its bushing 32, the other enlarged portion 31c of said screw is fixed by a key 34 in a sleeve 8, itself journalled in bushing 33.

A motor 22 drives pulley 23 through a belt transmission. On the shaft of said pulley 23, there is mounted a sprocket wheel 25 coupled through a chain with another wheel 26. A sprocket wheel 27 keyed on the same shaft as wheel 26, drives, through a chain, a wheel 9 forming a part of the sleeve 8, thus rotating both sleeve 8 and screw 31.

Sleeve 8 carries two arms 8a and 8b which support the spindles of two reels 10 and 11 respectively. Reel 11 carries a band of Cellophane or similar material wound thereon. Reel 10 carries a band of cotton cloth.

Sleeve 8 further carries two other arms 8c and 8d, located in a plane at right angles to the plane of arms 8a and 8b. As shown by Figs. 6 and 8, arm 8c carries, adjustably fixed thereon, a lever 12b on the end of which is journalled a double roller 12 (Fig. 10) adapted to bear upon the tube structure carried by the screw. In a likewise manner, arm 8d carries, adjustably fixed thereon, a lever 12a to the inner end of which there is pivoted a member carrying two other double rollers 12. In this way these three rollers 12, the centers of which are located at the apices of an equilateral triangle, are applied against the tube structure in directions at right angles to the axis of the supporting screw.

The structure of these rollers 12 is clearly visible in Fig. 10. Their periphery is bevelled so as to be able to force matter into the interval between two successive helices of the spring. Preferably, as shown by Fig. 10, each roller is made of two independently revolving elements.

The axes of said rollers 12 are suitably inclined to the direction of the axis of the screw 31 so that their peripheries can fit in the hollow between two successive helices of the spring (see Fig. 6).

It will be noted that the portion of reduced diameter 31d of the threads of the screw starts from the point where rollers 12 are acting upon the material applied around the spring, so that said material can be forced by said rollers into the interval between the helices of the spring.

The arms 8c and 8d of sleeve 8 further carry two spools 37 and 40.

Spool 37 carries a fine linen thread 37a which is kept tensioned due to its passing around pins 38 rigidly fixed to arm 8c. Then string 37a passes in the groove of a guiding pulley 39 and it is wound in the helical groove which has been formed by rollers 12 in the material surrounding the spring.

Spool 40 carries a bigger string 40a intended to fill up the helical groove in the surface of the tube material above mentioned, whereby the outer surface of the tube after this operation is substantially smooth. A rod 44 carried by lever 12a is provided at its end with an eye for guiding the string 40a to the groove of the tube.

Behind these mechanisms, I provide means for preventing rotation of the tube structure which has already been formed and which tends to be twisted under the effect of the various wrapping operations above described. Said means for preventing rotation of the tube consist in a plurality of radially arranged rollers located in planes passing through the axis of the tube, said rollers being free to rotate about their respective axes and being elastically urged toward the axis of the tube.

For instance, as shown by Figs. 1, 4, 6 and 7, I use three rollers 13. The two lower rollers, located in planes making angles of 60° with the vertical plane of the axis of the tube have their spindles carried by supports movable in inclined slideways 43 provided in a rigid support 43 fixed to the frame of the machine, so that the position of each of said roller supports can be individually adjusted in the corresponding slideway 43a. As for the third roller 13, its spindle is mounted in a stirrup-shaped member having horizontal branches 41 slidable along vertical rods carried by support 43, springs mounted on said rods forcing said branches 41 in a downward direction.

Arm 8b carries a guide member 111 superposed to reel 11 and the outer cylindrical surface 11b of which is in the form a circular arc having its center on the axis of screw 31. The band of protective material 11a, as it unwinds from reel 11, is guided along said surface 11b, then around roller 11c before winding around the metal spring 1 (Fig. 8).

On the frame of the machine, I provide a box 48 filled with glue 45a. If desired, this box can be heated by means of hot water present in a reservoir 49. In the box 48, there is journalled a roller 45 covered with felt and turning about an axis parallel to the axis of reel 11.

Box 48 carries a scraper 47, applied by a spring 46 against the periphery of roller 45, so as to remove the excess of glue present on the surface of roller 45 when the latter revolves.

When the machine is in operation, the surface 11b of structure 111 carrying the band of protective material moves tangentially along the periphery of roller 45, and the band 11a of protective materials is thus coated with glue over a length longer than the circumference of the spring.

In order to ensure a brushing application of the glue on the band of protective material, roller 45 is given a slow rotary movement about its axis through the provision of a belt 50, engaged on the one hand with a grooved pulley rigid with pulley 45 and on the other hand with a grooved pulley 35 connected with sleeve 8, as shown by Fig. 4.

With such an arrangement, roller 45 is given a peripheral speed lower than that of surface 11b and glue is deposited on the band of protective material by a brushing or rubbing action instead of a rolling engagement of roller 45 on surface 11b.

In order to apply glue on both faces of the band of protective material, I make use of the arrangement shown by Fig. 9.

As above explained, after having been provided with a coat of glue 45b on its outer side by rubbing against roller 45, the band of protective material passes over roller 11c and is then wound on the spring supported by screw 31, in an overlapping manner. As the glue is on the outer surface of the band of protective material, it is evident that the outer face of the tube is then covered with glue.

I further provide a roller 51, free to rotate about its axis 51a, itself carried by an arm rotatable about the axis of screw 31 together with sleeve 8, said spindle 51a being for instance carried by arm 8d, in a position such that the band of protective material 11a passes around a portion of the periphery of said roller 51, on its way from roller 11c to spring 1. This roller 51 is elastically applied against the periphery of spring 1. Therefore, as spindle 51a revolves in the direction of arrow $f^3$, roller 51 turns in the direction of arrow $f^4$ about said spindle, when rolling along the outer surface of the band 11a wound on the spring 1, already covered with a layer of glue 45b. Roller 51 thus removes the excess of said glue 45b and, as a consequence of its rotation in the direction of arrow $f^4$, it conveys said excess of glue onto the inner surface of the band of protective material 11a passing thereon, thus forming an inner glue coat 45c.

In this way, both faces of the band of protective material are coated with glue prior to the winding of said band on the metallic spring.

It will be noted that spools 10 and 11 are so positioned on sleeve 8 that the cotton band 10a is wound around the band of protective material 11a immediately after the winding of the band 11a.

The band 10a is made of loosely woven cotton cloth, so as to permit liquid rubber to enter thereinto, whereby the rubber layer is more intimately applied on the cloth layer.

On the left hand side of the machine, I provide a chamber 20 (Fig. 1) having its atmosphere heating in any suitable manner. For instance by means of heating electric resistances provided at the bottom of said chamber and through which air is forced into said chamber 20.

At the bottom of said chamber 20, there is a container 21, filled with latex 21b. This container which may be lowered to the position 21a when the machine is stopped, is adapted to be raised when the machine is to be run.

At the lower part of chamber 20, I provide two pulleys 15, arranged side by side on a common spindle, and at the upper part of said chamber, I provide, in a similar manner, two corresponding pulleys 16 and 17, the latter turning loose on its axis and the former being mounted with a frictional engagement with a pinion 30.

The tube passes over pulley 14, one of the pulleys 15 (being then immersed in latex) pulley 16, the other pulley 15 (receiving a second coating of latex) and pulley 17. Then the tube coated with latex (which has sufficiently dried owing to the heated atmosphere of chamber 20) leaves said chamber through aperture 60, to be finally wound on drum 18. On its way to said drum, the tube passes through a box 19 filled with talcum powder, so as to avoid any inconvenience as might result from the fact that the tube coated with fresh latex is still sticky.

The drum 18 is driven by means of a pulley 29 frictionally coupled to the shaft of the drum.

The pulley 29 is rotated by a belt 29a which passes over a pulley 28 driven by the motor 22. The pinion 30 is positively driven by a chain 30a which passes over a sprocket wheel 28a.

Owing to the frictional coupling of pulley 16 with pinion 30, and of drum 18 with pinion 29, said pulley 16 and said drum can slip with respect to their driving means and adapt themselves to the speed at which the tube is fed through the machine.

The spring 1, unwound from drum 2, is engaged on screw 31 exactly in the same manner as a nut is screwed on a threaded rod.

Since the enlarged portions of said screw, to wit 31b and 31c, fixed in sleeves 32 and 33 respectively, are journalled in bearings 6 and 7, it is clear that while screw 31 can be rotated about its axis by motor 22, it cannot move in the axial direction thereof.

As a result of the action of rollers 3, 4 and 5, which cooperate with the external surface of spring 1, said spring is positively prevented from turning about the axis of screw 31, while being able to move axially.

As the engagement of the screw with its bearings 6 and 7 does not interfere with the possibility for spring 1 to be threaded on screw 31, said spring is therefore given an axial translatory movement, along a perfectly straight line and without any possible deformation since it is constantly guided by screw 31 in the threads of which it remains engaged during this translatory displacement.

The wrapping and gluing of the band of protective material 11a around the spring and the subsequent wrapping of the cotton cloth band 10a around the coating of protective material, thus formed, result clearly from the position and movement of reels 11 and 10, carried by sleeve 8, which is rotated together with screw 31, and from the preceding explanations. Thus the spring receives two superposed coverings, one of protective material and the other of cotton cloth.

Then rollers 12 depress this covering in the intervals between the screw threads, whereby the layer of protective material is given a corrugated structure which ensures flexibility of the tube.

Still farther on, string 37a is tightly wound in the corrugations thus produced, so as to reinforce the structure, and string 40a is superposed to said string 37a so as to fill up the depressions and give the outer surface of the tube structure a smooth shape.

These wrapping operations, which must necessarily be performed with a certain tangential pull, tend to impart a certain rotary displacement to the tube portion extending from the point of application of the band of protective material to the point of application of strings 37a and 40a, that is to say to twist the portion of the tube. Such twisting must be prevented at all cost. This is accomplished by the rollers 13. It will be noted that, as one of these rollers is spring mounted, the tube can pass therethrough even when there are small changes in its diameter.

The tube structure then leaves screw 31, enters chamber 20, passes over pulleys 14, 15, 16, 15 and 17, being twice immersed in the latex bath, leaves chamber 20 through aperture 60, is covered with talcum powder in box 19, and is finally wound on drum 18.

It should be noted that the screw is made of two parts assembled together at 31e, permits of withdrawing the right hand side part of the screw for cleaning purposes without involving the necessity of removing the mechanisms supporting the other part of the screw or cooperating with this last mentioned part.

The tube structure obtained on drum 18 is finally completed by forming thereon a woven cover 61 in the usual manner or otherwise, so that the finished structure is as shown in section by Fig. 11.

Considering the tube structure before the application of the rubber layer 21c thereon, and without the woven covering. It will be found that, owing to the corrugated structure imparted to the layer of protective material, which corresponds to the existence of a helical groove extending between the turns of the spring, the whole has a certain flexibility.

Cellophane or an analogous protective material in the form of a simple sheet is pliable, but in the form of several layers glued together and shaped on a metal spring as above described it acquires a certain rigidity.

If a piece of metal spring coated with corrugated Cellophane is bent between the hands, the parts of the corrugations on the outside gradually flatten while the parts on the inside gradually deepen. But it will be noted that the flattening is not uniform over the whole length of the part that is being bent. The parts near the hands are but little flattened but transmit the deformation from one corrugation to the next one toward the center of the bent portion. Thus this middle part of the bent tube element is caused to withstand the whole stress and after a rather small number of repeated bendings, this middle part breaks.

If now the tube structure is considered in the state in which it is wound on the drum 18 of Fig. 1, that is to say with a rubber or analogous layer intimately applied on the cotton layer which surrounds the layer of protective material, it will be seen that, in view of the practically perfect adhesion of the rubber layer to the cotton cloth layer, which itself adheres intimately to the Cellophane layer, the rubber layer constitutes a kind of flexible and elastic sheath interconnecting the tops of the corrugations of the Cellophane layer.

Therefore, when a tube is bent and the tops of said corrugations are moved apart from one another on the outer side of the bent part, the resistance of this rubber sheath to being stretched limits the pulling apart of the tops of the corrugations in the middle of said bent tube and compels the other corrugations to share in the deformation, thus relieving the strain imposed on the middle corrugations of the Cellophane layer and preventing breaking thereof.

If the tube structure includes the woven cotton cover 61, the deformations of the corrugation over the whole arc of the bent part become perfectly uniform, since cotton is pliable but cannot be stretched and, since this outer cotton covering adheres to the rubber layer without any possibility of relative slipping. When a complete tube of this kind, including said outer woven cover is bent, a substantially perfect arc is obtained since all the corrugations are compelled to deform in a similar manner.

If there was no rubber layer, slipping would occur between the Cellophane layer and the outer woven cover, and the Cellophane layer would break in the middle of the bent part, as above explained.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the accompanying claims.

What I claim is:

1. A device for advancing a helical spring which comprises in combination: a screw having threads of the same pitch as the helices of said spring adapted to engage therewith, said screw having at least one section of its threads of a diameter larger than the outer diameter of said spring, means for rotating said screw cooperating with said section of the threads, and means for preventing the rotation of said spring without interfering with the rotation of said screw.

2. A device for continuously moving a helically wound structure along a rectilinear path with a translatory movement without rotation about its axis which comprises in combination, a screw having threads of the same pitch as said helically wound structure adapted to engage in said structure, the threads of said screw over at least one portion of the length thereof being of a diameter greater than the outer diameter of said helically wound structure, at least one bearing for said enlarged portion of the threads adapted to oppose axial movement of said screw, means for turning said screw in said bearing, and means adapted to cooperate with said helically wound structure for preventing rotation thereof about its axis.

3. A device for continuously moving a helical spring with a translatory motion along a rectilinear path in the direction of its axis which comprises in combination, a screw having threads of the same pitch as said spring adapted to engage therein, the threads of said screw over at least one portion thereof being of a diameter greater than the outer diameter of said spring, at least one bearing for said enlarged portion of the threads adapted to oppose axial movement of said screw, means for turning said screw in said bearing, and means adapted to cooperate with said spring on said screw for preventing rotation of said spring about its axis.

4. A device for continuously moving a helical spring with a translatory motion along a rectilinear path in the direction of its axis which comprises in combination, a screw having threads of the same pitch as said spring adapted to engage therein, the threads of said screw over at least one portion of the length thereof being of a diameter larger than the outer diameter of said spring, the threads over another portion of the length of said screw being of a diameter smaller than the outer diameter of said spring, at least one bearing for said enlarged portion of the threads adapted to oppose axial movement of said screw, means for turning said screw in said bearing, and at least one roller mounted about an axis at right angles to said screw having a resilient periphery in engagement with the outer surface of the spring.

5. A device for continuously moving a helical spring with a translatory motion along a rectilinear path in the direction of its axis which comprises in combination, a screw having threads of the same pitch as said spring adapted to engage therein, the threads of said screw over at least one portion of the length thereof being of a diameter greater than the outer diameter of said spring, the threads over at least another portion of the length of said screw being of a diameter smaller than the outer diameter of said spring, at least one bearing for said enlarged portion of the threads adapted to oppose axial movement of said screw, means for turning said screw in said bearing, two rollers having their respective peripheries made of rubber mounted on parallel shafts at right angles to said screw so as to embrace said spring, and means for radially adjusting the positions of said last mentioned shafts.

6. A machine of the type described for the manufacture of a continuous flexible tube which comprises in combination, means for supporting a helical spring for movement along a rectilinear path, means for moving said spring along said path with a translatory motion along said supporting means, means operatively connected with said driving means for continuously wrapping a band of a protective material around said spring supported by said supporting means, means for gluing said band prior to its application on said spring, means for continuously wrapping a band of cotton cloth around said band means for forcing said two bands between two adjacent helices of said spring, means for preventing rotation of said spring about its axis, means for receiving the tube structure from said rectilinear supporting means, and means for coating said tube on its way from said rectilinear supporting means to said receiving means.

7. A machine of the type described for the manufacture of a continuous tube comprising in combination, a screw for supporting and moving a helical spring, means for supporting said screw and preventing axial displacement thereof, driving means for turning said screw without interfering with the movement of said spring thereon, means for preventing rotation of said spring, means operatively connected with said driving means for continuously wrapping a band of protective material around the spring, means for applying glue to said band, means operatively connected with said driving means for continuously wrapping a band of cotton cloth around said protective material, means for forcing portions of the wrapped bands between adjacent helices of said spring, means for preventing rotation of said spring about the axis of said screw under the twisting influence of the wrapping means, a drum for receiving the tube structure from said screw, and means for coating said tube on its way from said screw to said drum.

8. A machine of the type described for the manufacture of a continuous tube comprising in combination, a screw for supporting and moving a metallic helical spring, said screw being so shaped that said spring can screw thereon, means for preventing axial displacement of said screw, driving means for turning said screw about its axis without interfering with the spring, means for preventing rotary displacement of said spring about the axis of said screw, means operatively connected with said driving means for continuously wrapping a band of protective material around the spring supported by said screw, means for applying glue to said band prior to its application on said spring, means operatively connected with said driving means for continuously wrapping a band of cotton cloth around said protective material, means for forcing portions of the wrapped bands between adjacent helices of said spring, means for continuously winding a string over the wrapped bands, said winding means being operatively connected with said driving means, means for preventing rotation of said spring about the axis of said screw, a drum for receiving the tube structure from said screw, and means interposed between said screw and said drum for coating said tube structure.

9. A machine of the type described for the manufacture of a continuous tube comprising in combination, a frame, a drum journalled in said frame for carrying a helical spring, a screw having threads of a pitch equal to that of said spring and engaging therein, means for preventing axial displacement of said screw, journals for said screw and driving means for turning it about its axis without interfering with the advance of said spring thereon, radial rollers for preventing rotary displacement of said spring about the axis of said screw, a sleeve movable with said screw and coaxially surrounding the screw, arms carried by said sleeve, a reel adapted to carry a band of protective material journalled on one of said arms, means for gluing said band prior to its application on said spring, a reel carried by another of said arms adapted to carry a band of cotton cloth, roller means carried by said sleeve for forming portions of said bands between adjacent helices of said spring so as to form a helical groove in the outer surface of the tube structure, a reel adapted to wind a string in said helical groove as it is moving past a further point of said screw, a reel adapted to wind a string in said groove over said first mentioned string, spring mounted radial rollers having their axes at right angles to said screw for preventing rotation of the tube structure, a drum for receiving the tube structure after it has left said screw, and means for coating said tube structure.

10. A machine according to claim 6 in which the gluing means include a glue receptacle, a roller immersed partly in the glue of said receptacle and adapted to turn freely therein, a spring scraper adapted to cooperate with said roller, guiding means for the band of protective material including a cylindrical surface having its center on the axis of said screw and adapted to come in tangential contact with said roller, and means operative by said driving means for turning said roller at a speed ensuring a rubbing contact of the periphery thereof with the band present on said cylindrical surface.

11. A machine according to claim 6 in which the means for coating the tube structure includes a heated chamber, means for circulating the tube structure through said chamber, and a container filled with liquid rubber located in such manner that the tube structure in the course of its movement in said chamber is immersed in said liquid rubber.

12. A machine of the type described for the manufacture of a continuous flexible tube which comprises in combination, a threaded screw for supporting and moving a helical spring of the same pitch as the threads of the screw, said screw being so shaped that said spring can screw thereon in the intervals between the threads thereof, means for supporting said screw and preventing axial displacement thereto, driving means for turning said screw about its axis without interfering with the screwing movement of said spring thereon, means for preventing rotation of said spring about the axis of said screw, means operatively connected with said driving means and located opposite a point of said screw for continuously wrapping a band of protective material around the spring supported by said screw, means for applying glue to said band prior to its application on said spring so as to form a continuous fluidtight layer of protective material around said spring, means operatively connected with said driving means and located opposite a further point of said screw for continuously wrapping a band of cotton cloth around said layer so as to form a continuous layer of cotton cloth around said layer, means located at a further point of the length of said screw for forcing portions of said two layers into the helical space between adjacent helices of said spring so as to form a continuous helical groove in the structure, means located at a further point of the length of said screw for preventing rotation of said spring about the axis of said screw under the twisting influence of the wrapping means, a drum for receiving the tube structure after it has left said screw, and means interposed between said screw and said drum for coating said tube on its way from said screw to said drum.

13. A machine according to claim 6 in which said glueing means include a glue receptacle, a roller partly immersed in the glue present in said receptacle, a spring scraper adapted to cooperate with said roller, rotatable guiding means for leading the protecting band onto said spring, said guiding means including a cylindrical surface having its center on the axis of said spring and its axis parallel to the axis of said roller, whereby the surface of the band on the guiding means comes in tangential contact with said roller in the course of movement of the guiding means, and means operative by said driving means for turning said roller at a speed ensuring a brushing contact of the periphery thereof with the band of protective material present on said cylindrical surface.

14. Apparatus according to claim 6 in which glueing means includes a receptacle for receiving a liquid adhesive, a roller partly immersed in the adhesive within the receptacle adapted to turn about an axis parallel to the axis of the spring, rotatable guiding means for leading the band of protecting material onto said spring, said guiding means including a cylindrical surface having the center thereof aligned with the axis of said spring and parallel to the axis of said roller whereby the surface of the band on the guiding means comes in tangential contact with the roller in the course of movement of the guiding means, means operated by said driving means for turning said roller at a speed ensuring a brushing contact of the periphery thereof with the band of protecting material on said cylindrical surface, and a freely rotatable roller adapted to engage the outer surface of the protecting material wound on the spring and to engage the adhesive carried thereon and engage the inner surface of the band to carry adhesive material from the outer surface of the band to the inner surface thereof.

ABEL EDGAR CHERNACK.